3,476,680
SOLVENT REFINING OF HYDROCARBON MIXTURES WITH N-METHYL-2-PYRROLIDONE
Richard L. Coleman, Port Arthur, Tex., assignor to Texaco Inc., New York, N.Y., a corporation of Delaware
Filed Nov. 28, 1967, Ser. No. 686,207
Int. Cl. C10g 21/20
U.S. Cl. 208—326                        12 Claims

ABSTRACT OF THE DISCLOSURE

A solvent extraction process for the separation of hydrocarbon mixtures boiling above 396° F. into raffinate product of decreased aromaticity and extract product of increased aromaticity by contact with a solvent comprising N-methyl-2-pyrrolidone involving separation of raffinate phases into oil and solvent fractions and treatment of the resulting solvent fraction with a low boiling liquid hydrocarbon to separate dissolved oil therefrom.

BACKGROUND OF THE INVENTION

Field of the invention

In the manufacture of lubricating oils from raw petroleum stocks, it is necessary to remove unstable, naturally occurring materials which form deposits or become corrosive in operating equipment as a result of heating and oxidation or both. Additionally, in the case of paraffinic oils it is often desirable to increase the viscosity index by removing the more aromatic constituents from the oil. To accomplish this, it is necessary to remove or destroy a significant amount of material present in the raw stock, typically ranging from 10 to 60 percent, depending upon the qualities desired in the product oil. Additionally, gas oil stocks, for example, cracking stocks, fuels, and middle distillates, may be upgraded by treatment to separate fractions of increased paraffinicity from fractions of increased aromaticity. A common way to effect such separation is by liquid-liquid solvent extraction with a solvent having selectivity for the aromatic constituents and the more unstable molecules which are predominantly aromatic and non-hydrocarbon materials.

This invention is directed to the solvent extraction of hydrocarbon mixtures using N-methyl-2-pyrrolidone (referred to hereinafter as NMP) as selective solvent. More particularly it is directed to the solvent extraction of hydrocarbon mixtures boiling wholly above NMP, that is above 396° F. and preferably having an ASTM initial boiling point of at least 650° F. for example lubricating oil fractions, cracking stocks, fuels, and middle distillates. Such stocks are treated to effect separation of a raffinate product of increased stability and viscosity index and increased paraffinicity from an extract product of increased aromaticity.

In solvent refining with NMP, the raffinate phase formed comprises raffinate product and dissolved NMP. Advantageously dissolved NMP may be separated from the raffinate product in several steps, one step of which involves the separation of an oil phase from an NMP phase containing some dissolved oil. Such separations may be obtained by cooling the raffinate phase to a temperature below the extraction temperature or by contacting the raffinate phase with water. Although the amount of dissolved oil present in the separated NMP phase is generally less than about 5.0 weight percent, this amount of oil in the recycle solvent stream is objectionable since it lessens the solvent power of the solvent in the system and requires increased solvent dosages to achieve a given degree of separation. This invention then is directed to a means of separating dissolved oil from an NMP phase separated from the raffinate in an NMP solvent refining process.

Description of the prior art

In accordance with the prior art practice in the solvent refining of hydrocarbon stocks with NMP, distillation or reextraction with a secondary solvent has been used to effect complete separation of dissolved NMP from the raffinate phase. Such complete separation in a single step presents problems with some stocks such as the necessity of high distillation temperatures which may impair product quality with thermal recovery techniques and the creation of emulsion separation problems with reextraction techniques.

SUMMARY OF THE INVENTION

In accordance with this invention, a hydrocarbon mixture boiling above 396° F., to be separated in fractions of higher and lower aromaticity, is contacted with a solvent comprising NMP forming a raffinate phase comprising raffinate product with a minor portion of said solvent dissolved therein and an extract phase comprising solvent with extract product dissolved therein.

Dissolved solvent is separated from the raffinate phase in two steps, the first step effecting separation of the raffinate phase into a solvent rich phase comprising NMP and a small amount of dissolved oil and an oil phase comprising the bulk of the raffinate product. The separated solvent phase is then treated with a liquid hydrocarbon having an end point at least 25° below the NMP solvent, that is below 370° F., effecting separation of dissolved oil from the solvent phase. The thus treated solvent stream is substantially free of dissolved oil, is stripped of dissolved liquid hydrocarbon, and is returned to the primary extraction system. The resulting solution of dissolved oil in the liquid hydrocarbon fraction is then distilled separating the liquid hydrocarbon stream as distillate for recycle to the treating step and separating refined oil product as distillation bottoms.

The initial separation of the raffinate phase into solvent and oil phase is advantageously done by cooling to a temperature at least 10° F. below the extraction temperature or by contacting the raffinate phase with water.

BRIEF DESCRIPTION OF DRAWINGS

The figures show block diagrams of processing sequences which may be used in accordance with the process of this invention. Although the drawings are described in connection with a specific embodiment, it is not intended to limit the invention to the particular materials or conditions described.

Figure 1:
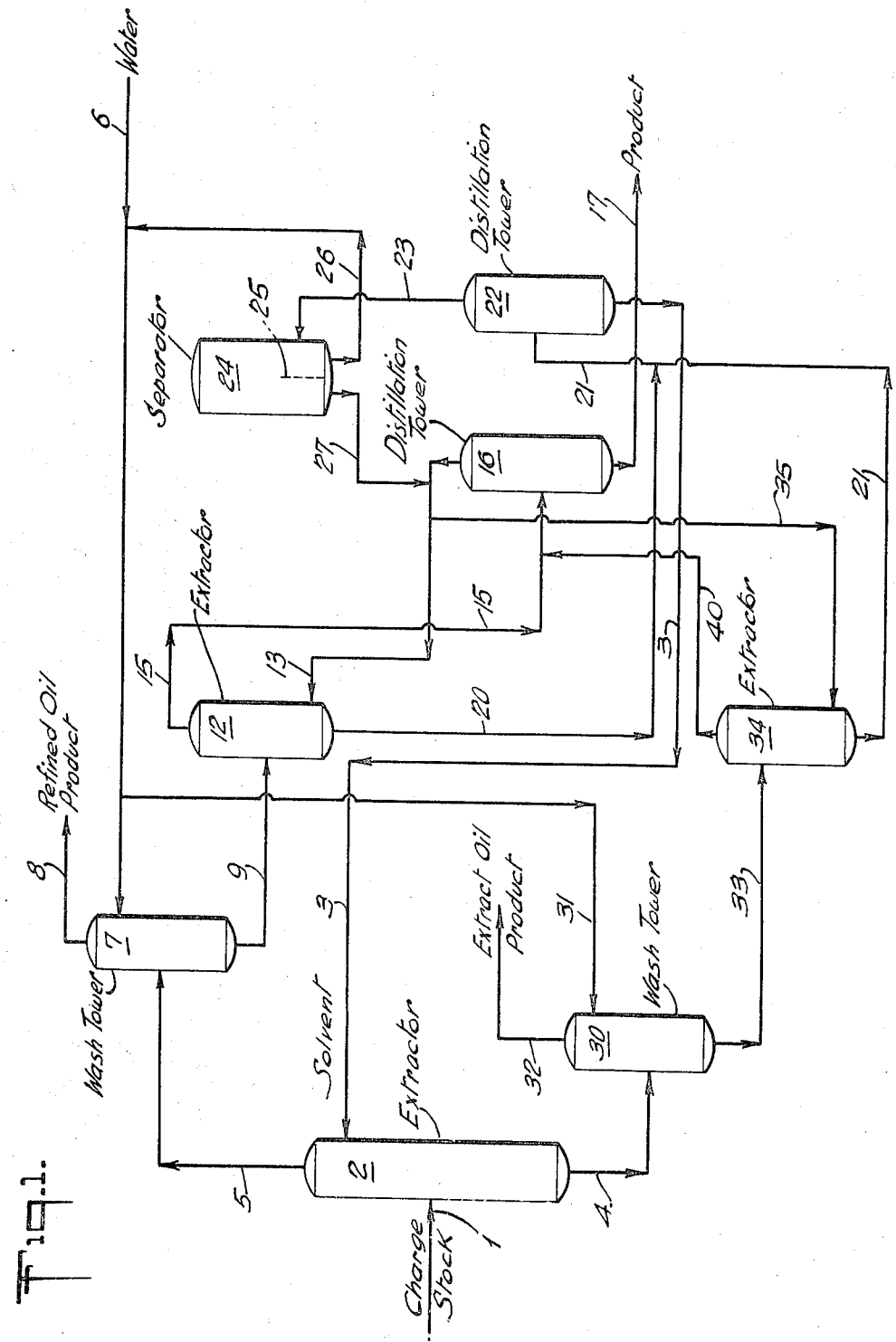
Referring to FIGURE 1, charge stock, which suitably may be a lubricating oil distillate, is charged through line 1 to extractor 2. NMP solvent is introduced through line 3 into extractor 2. Extractor 2 may be liquid-liquid contacting device having from one to ten theoretical stages, for example, a packed, spray, or a sieve tray column with or without pulsing, a rotating disc contactor or a centrifugal contacting device. The constituents of the charge soluble in the solvent (predominantly aromatic in nature) are dissolved in the solvent and are withdrawn as extract phase through line 4. The insoluble constituents of the charge (predominantly paraffinic in type) are withdrawn as raffinate through line 5, the raffinate phase is then passed to water contacting tower or wash tower 7. In wash tower 7, the raffinate phase containing a small amount of dissolved NMP solvent is contacted with water introduced through line 6 washing dissolved solvent from the oil. Wash tower 7 may be a liquid-liquid contacting device having from one to ten theoretical stages and may be similar to extractor 2. The raffinite product comprising solvent free refined oil is discharged from wash tower 7 through line 8 to product storage and further processing. Water washings are withdrawn from tower 7 through line 9. The water washings comprise predominantly water along with NMP and dissolved oil in an amount within the range of about 0.1 to 5 volume percent. The water washings in line 9 are then passed to extraction tower 12 wherein the wash water is countercurrently contacted with liquid hydrocarbon introduced through line 13.

Extraction tower 12 is a countercurrent liquid-liquid contacting device and may be similar to extractor 2 or wash tower 7. The light hydrocarbon may be a paraffinic hydrocarbon, naphthenic hydrocarbon, aromatic hydrocarbon or mixtures of hydrocarbon types which are liquid at the pressure of extractor 12 and which boil at least 25° F. below the boiling point of the solvent. Paraffinic hydrocarbons are preferred since they are the least soluble in the solvent. Examples of preferred hydrocarbons are paraffin hydrocarbons having 3 to 14 carbon atoms. Raffinate from extractor 12 comprising the light hydrocarbon and oil extracted from the solvent is discharged through line 15 and passed to distillation tower 16. Light hydrocrbon is separated as distillate from tower 16 through line 13 and oil product is withdrawn as distillation bottoms through line 17.

The heavy liquid phase from extractor 12 is withdrawn through line 20 and comprises solvent, water and a small equilibrium amount of light hydrocarbon. The solvent fraction in line 20 is passed through line 21 to distillation tower 22. Distillate from tower 22 comprising water and light hydrocarbon is passed through line 23 to separator 24. Separator 24 comprises a vessel divided into two compartments by weir 25. The heavier water phase separates in the inlet compartment of separator 24 and is withdrawn through line 26. The separated water is advantageously reused to comprise a part of the wash water passed to tower 7 through line 6. Light hydrocarbon overflows weir 25, is withdrawn through line 27, and is recycled with the light hydrocarbon in line 13. Dry solvent is withdrawn from the bottom of tower 22 through line 3 for recycle to extractor 2.

Extract phase from extractor 2, withdrawn through line 4, is passed to wash tower 30 where it is countercurrently contacted with water from line 31. Wash tower 30 is a liquid-liquid countercurrent contacting device having from one to ten theoretical stages and may be of similar design to extractor 2. Solvent free extract oil product leaves wash tower 30 through line 32 for further processing or use. Water containing dissolved NMP solvent and oil leaves water wash tower 30 through line 33 and is passed to extractor 34 where it is countercurrently contacted with light hydrocarbon introduced through line 35. Light hydrocarbon containing extracted oil is discharged through line 40, combined with the stream in line 15 and passed to tower 16. Remaining water containing dissolved NMP is withdrawn from extractor 34 through line 21 and passed to distillation tower 22 as described above. Oil product withdrawn through line 17 may be withdrawn as a separate product or may be combined with the refined oil or extract oil product depending upon the quality requirements of the respective streams.

Figure 2:
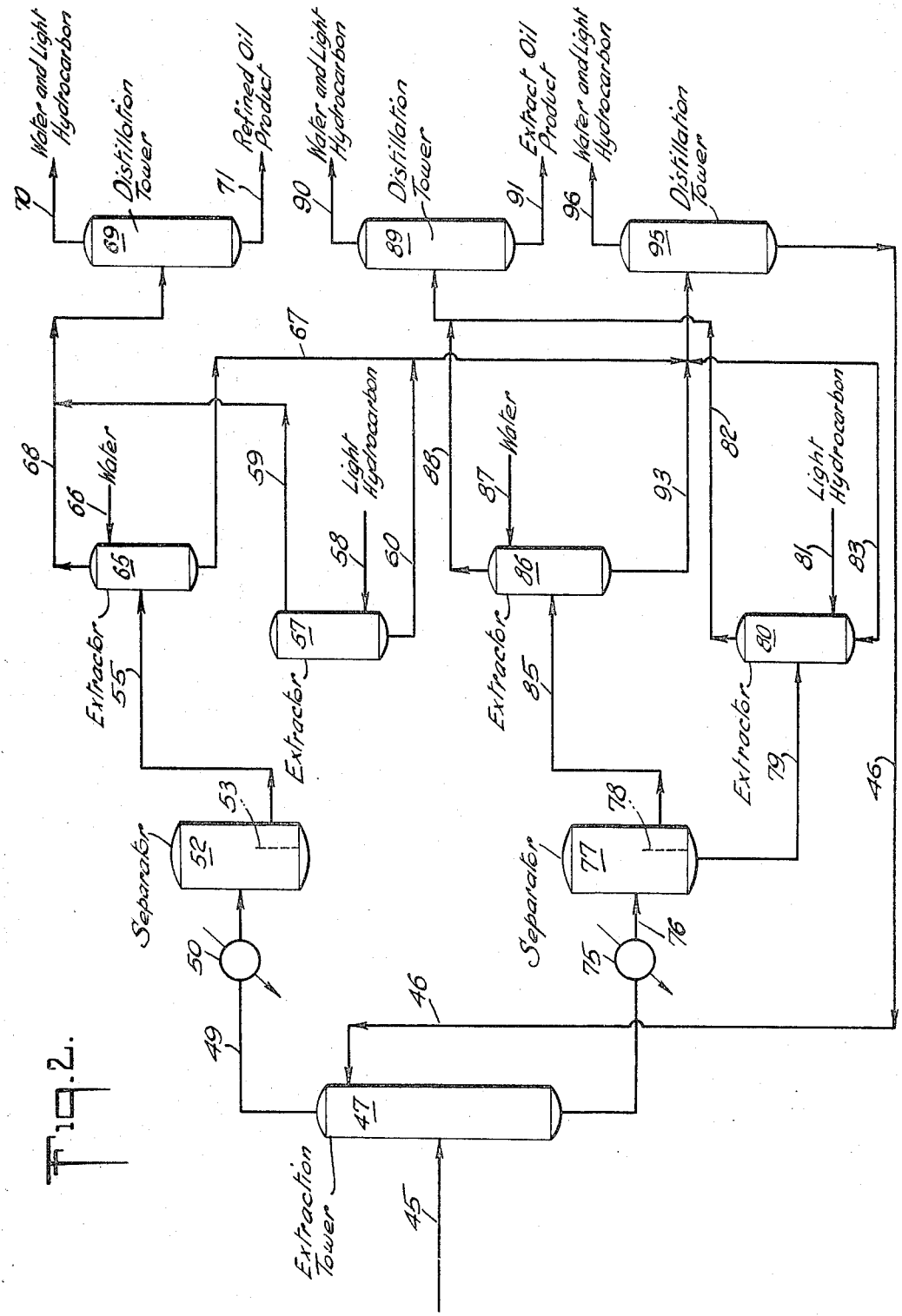

FIGURE 2 illustrates an embodiment of this invention wherein dissolved oil from extract and raffinate processing is recovered separately. In the embodiment shown in FIGURE 2, charge oil in line 45 is countercurrently contacted with NMP solvent from line 46 in extraction tower 47. Constituents of the charge stock soluble in NMP solvent are extracted and leave tower 47 through line 48. The extract phase comprises primarily aromatic hydrocarbons and the bulk of the solvent. Raffinate comprising the nonextracted constituents of the charge stock and some dissolved solvent is discharged from extractor 47 through line 49, cooled in exchanger 50 and passed through line 51 to separator 52. Separator 52 is provided with a weir 53 which divides separator 52 into inlet and outlet compartments. Dissolved solvent separates and collects in the inlet compartment of separator 52 and is withdrawn through line 54. Remaining oil phase overflows weir 53 and is collected in the outlet compartment of separator 52 and withdrawn through line 55. The stream withdrawn through line 54 comprising predominantly solvent along with a small amount of refined oil is countercurrently contacted in extractor 57 with light hydrocarbon introduced through line 58. The light hydrocarbon, boiling at least 25° F. below the boiling point of the solvent, extracts dissolved product oil from the solvent and the solution of light hydrocarbon and oil is withdrawn through line 59. Solvent with some dissolved light hydrocarbon is withdrawn from the bottom of tower 57 through line 60.

The separated hydrocarbon phase in line 55 is passed to extractor 65 wherein it is countercurrently contacted with water introduced through line 66. Dissolved solvent is separated from the oil and is withdrawn from the bottom of extractor 65 through line 67. Refined oil, washed free of solvent, is discharged from the top of extractor 65 through line 68, combined with the oil from line 59 and the mixture passed to distillation tower 69. In tower 69, dissolved light hydrocarbon and water are separated as a distillate through line 70 for recycle and refined oil product is withdrawn through line 71.

Extract in line 48 is cooled in exchanger 75 effecting separation of oil and solvent phases and the cool mixture is passed through line 76 to separator 77. Separator 77 is provided with a weir 78 forming inlet and outlet compartments. Separated solvent phase collects in the inlet compartment of separator 77, is withdrawn through line 79, and passed to hydrocarbon extraction tower 80 wherein it is countercurrently contacted with light hydrocarbon introduced through line 81. In extractor 80, the dissolved oil in the solvent phase is removed by the light hydrocarbon and the resulting solution is withdrawn from the top of extractor 80 through line 82. Bottoms are withdrawn from extractor 80 through line 83 comprising NMP solvent together with some dissolved light hydrocarbon.

Oil phase in separator 77 overflows weir 78 and is withdrawn through line 85. Oil phase is passed to extractor 86 wherein it is countercurrently contacted with water introduced through line 87. The water washes the dissolved solvent from the oil. Wash water containing the solvent washed from the oil in extractor 86 is withdrawn through line 93. Oil, washed free of solvent, is withdrawn through line 88, combined with the stream in line 82, and the mixture passed to distillation tower 89. In distillation tower 89, the light hydrocarbon and water are separated as a distillate which is withdrawn through line 90 from the extract oil product which is withdrawn through line 91.

Solvent containing streams from line 67, 60, 93 and 83 are combined and passed to distillation tower 95 wherein water and light hydrocarbon are withdrawn as distillate through line 96 and dry NMP solvent is withdrawn as distillation bottoms through line 46 for recycle to extraction tower 47. The water and light hydrocarbon distillates in lines 70, 90 and 96 may be combined and separated to provide recycle water and light hydrocarbon for use in extractor towers 65, 57, 86 and 80 as described above.

Ranges of operating conditions including the preferred ranges for the treating tower, refined oil and extract oil water extraction towers, and refined oil and extract oil light hydrocarbon treating towers are shown below:

| | Operating Range | Preferred Range |
|---|---|---|
| Extractor Tower 2 and 47: | | |
| Temperature, °F.: | | |
| Top | Ambient to 390 | 150 to 250. |
| Bottom | do | 100 to 200. |
| Pressure, p.s.i.g | 0 to 100 | 20 to 50. |
| Solvent Dosage, Vol. Percent Basis Charge. | 50 to 500 | 100 to 300. |
| Refined Oil Water Extraction Tower 7 and 65: | | |
| Temperature, °F | Ambient to 210 | 150 to 190. |
| Pressure, p.s.i.g | 0 to 100 | 10 to 20. |
| Water Dosage, Vol. Percent Basis Solvent in Feed. | 5 to 500 | 10 to 200. |
| Extract Oil Water Extraction Tower 30 and 86: | | |
| Temperature, °F | Ambient to 210 | 150 to 190. |
| Pressure, p.s.i.g | 0 to 100 | 10 to 20. |
| Water Dosage, Vol. Percent Basis Solvent in Feed. | 5 to 500 | 10 to 200. |
| Refined Oil Light Hydrocarbon Treating Tower 12 and 57: | | |
| Temperature, °F | Ambient to boiling point of light hydrocarbon. | 100 to 150. |
| Pressure, p.s.i.g | 0 to 100 | 0 to 20. |
| Light Hydrocarbon Dosage, Vol. Percent Basis Total Feed. | 5 to 500 | 10 to 200. |
| Extract Oil Light Hydrocarbon Treating Tower 34 and 80: | | |
| Temperature, °F | Ambient to boiling point of light hydrocarbon. | 100 to 150. |
| Pressure, p.s.i.g | 0 to 100 | 0 to 20. |
| Light Hydrocarbon Dosage, Vol. Percent Basis Total Feed. | 5 to 500 | 10 to 200. |
| Raffinate Phase Settler 52: Temperature, °F. | Ambient to 10° F. cooler than raffinate from extractor. | 140 to 240. |
| Extract Phase Settler 77: Temperature, °F. | Ambient to 10° F. cooler than extract phase from extractor. | 90 to 190. |

DESCRIPTION OF THE PREFERRED EMBODIMENTS

In an embodiment of this invention, a vacuum distillate from crude distillation is refined with NMP in the apparatus described in connection with FIGURE 1. An oil feed having a gravity of 25.7° API and a viscosity index before dewaxing of 74 is contacted with NMP containing 1.0 weight percent water at a solvent dosage of 240 percent and an extract phase outlet temperature of 190° F. The resulting refined oil is washed with water at a temperature of 190° F. and a water dosage of 100 percent basis the solvent content of the oil. In this case the solvent content was 20 percent. The resulting refined oil is produced at a yield of 53 weight percent and has a gravity of 30.3° API and a viscosity index before dewaxing of 109. The water washings containing NMP solvent and some dissolved oil are contacted with a paraffinic hydrocarbon fraction having a boiling range of 200 to 350° F. at a temperature of 100° F. and at a dosage of 100 volume percent to effect separation of the dissolved oil from the NMP-water mixture.

Extract phase from the extraction tower is washed with water at a temperature of 190° F. and a water dosage of 200 volume percent basis solvent in extract phase effecting separation of the NMP solvent from the extract oil product. The resulting extract product produced at a yield of 41 weight percent is highly aromatic having a gravity of 20.7° API and a refractive index of 1.5114 at 70° C. The resulting water washings containing NMP and a small amount of dissolved oil are then extracted with the same paraffinic hydrocarbon fraction described above at a temperature of 100° F. and a dosage of 200 volume percent effecting separation of the dissolved oil from the water-NMP mixture. The light hydrocarbon washings containing the oil reextracted from the water washings are combined and distilled separating the light hydrocarbon for recycle from a fraction of 6 percent basis charge of an oil which is intermediate in quality between the extract and raffinate products. The water-NMP washings are redistilled separating water which is recycled for further treating from dry NMP solvent which is returned to the extraction zone.

I claim:

1. In the solvent refining of a hydrocarbon mixture boiling above 396° F. effecting separation of said hydrocarbon mixture into a raffinate product of reduced aromaticity and an extract product of increased aromaticity wherein said hydrocarbon mixture is contacted with a solvent comprising N - methyl - 2 - pyrrolidone forming a raffinate phase comprising said raffinate product and dissolved solvent and an extract phase comprising said solvent and dissolved extract product, and said raffinate phase is thereafter separated into an oil phase comprising said raffinate product and a solvent phase comprising N-methyl-2-pyrrolidone and dissolved oil, the improvements which comprises:

contacting said solvent phase with a liquid hydrocarbon having an end point below 370° F. effecting separation of dissolved oil from said solvent phase forming a solvent stream containing dissolved liquid hydrocarbon but substantially free of said dissolved oil and a liquid hydrocarbon stream containing said dissolved oil, stripping said dissolved liquid hydrocarbon from said solvent stream, recycling thus stripped solvent stream, separating said dissolved oil from said liquid hydrocarbon stream containing said dissolved oil forming an oil product stream and a liquid hydrocrabon stream, and recycling said liquid hydrocarbon stream.

2. The process of claim 1 wherein said hydrocarbon mixture is contacted with said solvent at a temperature within the range of about 70 to 390° F., at a solvent dosage within the range of about 50 to 500 percent, and at a pressure within the range of about 0 to 100 p.s.i.g., and said solvent phase is contacted with said liquid hydrocarbon at a pressure within the range of about 0 to 100 p.s.i.g., at a temperature within the range of about 70° F. to the initial boiling point of said liquid hydrocarbon at the prevailing pressure, and at a liquid hydrocarbon dosage within the range of about 5 to 500 percent of the solvent phase.

3. The process of claim 1 wherein said hydrocarbon mixture is contacted with said solvent at a temperature within the range of about 150 to 250° F., at a solvent dosage within the range of about 100 to 300 percent, and at a pressure within the range of about 20 to 50 p.s.i.g., and said solvent phase is contacted with said liquid hydrocarbon at a pressure within the range of about 0 to 20 p.s.i.g., at a temperature within the range of about 100 to 150° F., and at a liquid hydrocarbon dosage within the range of about 10 to 200 percent of the solvent phase.

4. The process of claim 1 wherein said hydrocarbon mixture is contacted with said solvent at an extraction temperature within the range of about 70 to 390° F. and said raffinate phase is cooled to a temperature at least 10° F. below said extraction temperature effecting separation of said oil phase and said solvent phase.

5. The process of claim 4 wherein said extraction temperature is within the range of about 150 to 250° F.

6. The process of claim 4 wherein said extract phase is cooled to a temperature at least 10° F. below said extraction temperature effecting separation of a secondary raffinate phase and a secondary extract phase, said secondary raffinate is contacted with water at a temperature within the range of about 70 to 210° F., a pressure within the range of about 0 to 100 p.s.i.g., and at a rate within the range of about 5 to 500 percent of the N-methyl-2-pyrrolidone in said secondary raffinate, and said secondary extract phase is contacted with a liquid hydrocarbon having an end point below 370° F. at a temperature within the range of about 70 to 370° F., a pressure within the range of about 0 to 100 p.s.i.g., and at a rate within the range of about 5 to 500 volume percent of the secondary extract phase.

7. The process of claim 4 wherein said extract phase is cooled to a temperature within the range of about 90 to 190° F. effecting separation of a secondary raffinate phase and a secondary extract phase, said secondary raffinate is contacted with water at a temperature within the range of about 150 to 190° F., a pressure within the range of about 10 to 20 p.s.i.g., and at a rate within the range of about 10 to 200 percent of the N-methyl-2-pyrrolidone in said secondary raffinate, and said secondary extract phase is contacted with a liquid hydrocarbon having an end point below 370° F. at a temperature within the range of about 100 to 150° F., a pressure within the range of about 0 to 20 p.s.i.g. and at a rate within the range of about 10 to 200 volume percent of the extract product in said secondary extract.

8. The process of claim 1 wherein said raffinate phase is contacted with water effecting separation of said oil phase and a solvent phase comprising N-methyl-2-pyrrolidone, dissolved oil, and water.

9. The process of claim 8 wherein said raffinate phase is contacted with about 5 to 500 volume percent water per volume of N-methyl-2-pyrrolidone in said raffinate phase, at a temperature within the range of about 70 to 210° F., and a pressure within the range of about 0 to 100 p.s.i.g.

10. The process of claim 8 wherein said raffinate phase is contacted with about 10 to 200 volume percent water per volume of N-methyl-2-pyrrolidone in said raffinate phase, at a temperature within the range of about 150 to 190° F., and at a pressure within the range of 10 to 20 p.s.i.g.

11. The process of calim 8 wherein said extract phase is contacted with water at a temperature within the range of about 70 to 210° F., a pressure within the range of 0 to 100 p.s.i.g., and at a rate within the range of about 5 to 500 volume percent water per volume of N-methyl-2-pyrrolidone in said extract phase forming a secondary raffinate comprising said extract product and a secondary extract comprising N-methyl-2 - pyrrolidone, dissolved oil, and water, and said secondary extract is contacted at a temperature within the range of about 70 to 370° F. with a liquid hydrocarbon having an end point below 370° F., at a pressure within the range of about 0 to 100 p.s.i.g. and at a rate within the range of about 5 to 500 volume percent of said secondary extract.

12. The process of claim 8 wherein said extract phase is contacted with water at a temperature within the range of about 150 to 190° F., a pressure within the range of about 10 to 20 p.s.i.g. and at a rate within the range of of about 10 to 200 volume percent water per volume of N-methyl-2-pyrrolidone in said extract phase forming a secondary raffinate comprising said extract product and a secondary extract comprising N-methyl-2-pyrrolidone, dissolved oil, and water, and said secondary extract is contacted at a temperature within the range of about 100 to 150° F. with a liquid hydrocarbon having an end point below 370° F., at a pressure within the range of about 0 to 20 p.s.i.g. and at a rate within the range of about 10 to 200 volume percent of said secondary extract.

References Cited
UNITED STATES PATENTS

| | | | |
|---|---|---|---|
| 2,745,790 | 5/1956 | Manley | 208—321 |
| 2,933,448 | 4/1960 | Morin et al. | 208—326 |
| 2,963,427 | 12/1960 | Nevitt | 208—326 |
| 2,969,317 | 1/1961 | Hess | 208—321 |

HERBERT LEVINE, Primary Examiner

U.S. Cl. X.R.

208—321